United States Patent
Oh et al.

(10) Patent No.: US 7,366,516 B1
(45) Date of Patent: Apr. 29, 2008

(54) LOCALIZED SMS MESSAGING BASED ON LOCATION OF A MOBILE STATION

(75) Inventors: Dae-Sik Oh, Overland Park, KS (US); Thomas Steele, Shawnee, KS (US); Kristin Hayne, Overland Park, KS (US); Leo Anderson, Raymoore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 247 days.

(21) Appl. No.: 10/921,639

(22) Filed: Aug. 18, 2004

Related U.S. Application Data

(63) Continuation-in-part of application No. 10/438,563, filed on May 14, 2003.

(51) Int. Cl.
*H04Q 7/20* (2006.01)

(52) U.S. Cl. ............... 455/445; 455/404.2; 455/466
(58) Field of Classification Search ........... 455/445, 455/404.2, 466; 370/229
See application file for complete search history.

(56) References Cited

U.S. PATENT DOCUMENTS

| | | | |
|---|---|---|---|
| 5,305,466 A | 4/1994 | Taketsugu | 455/33.1 |
| 5,369,681 A | 11/1994 | Boudreau et al. | 455/456.1 |
| 5,953,667 A | 9/1999 | Kauppi | 455/440 |
| 6,052,591 A * | 4/2000 | Bhatia | 455/445 |
| 6,058,308 A | 5/2000 | Kallin et al. | 455/432.3 |
| 6,138,025 A | 10/2000 | Lee et al. | 455/453 |
| 6,230,017 B1 | 5/2001 | Andersson et al. | 455/456.6 |
| 6,542,716 B1 | 4/2003 | Dent et al. | 455/13.1 |
| 6,584,316 B1 | 6/2003 | Akhteruzzaman et al. | 455/445 |
| 6,625,461 B1 * | 9/2003 | Bertacchi | 455/466 |
| 6,718,178 B1 | 4/2004 | Sladek et al. | 455/466 |
| 2002/0159387 A1 * | 10/2002 | Allison et al. | 370/229 |
| 2003/0027572 A1 | 2/2003 | Karlsson et al. | 455/433 |
| 2003/0148771 A1 | 8/2003 | De Verteuil | 455/456 |
| 2003/0157945 A1 | 8/2003 | Chen et al. | 455/458 |
| 2004/0203770 A1 | 10/2004 | Chen et al. | 455/435.1 |
| 2004/0248546 A1 * | 12/2004 | Bhaumick | 455/404.2 |
| 2005/0192024 A1 | 9/2005 | Sheynblat | 455/456.1 |

OTHER PUBLICATIONS

Marlar Wain, "*Paging Networks*" available online at http: // services.eng .uts.edu au/ ~ kumbers /raWireless_Networks/Paging/wain/marlar.htm , pp. 1-18, circa 2002.

Gallagher et al., "*Chapter 13- Short Message Service Functions*", Mobile Telecommunications Networking With IS-41, McGraw Hill, McGraw Hill Series on Telecommunications, pp. 285-310 (1997).

Decision from Board of Appeals in U.S. Appl. No. 10/438,563, filed May 14, 2003, dated Jul. 30, 2007.

* cited by examiner

*Primary Examiner*—Joseph Feild
*Assistant Examiner*—Phuoc Doan

(57) ABSTRACT

A method is provided of targeting short message service (SMS) message for delivery to a mobile station. When an SMS center (SMSC) in a cellular network receives an SMS message and is to send it to a mobile station, the SMS center determines the location of the mobile station either directly or indirectly via a location register. The SMS center correlates that location with a particular base transceiver station serving that location. The SMS center then causes the SMS message to be delivered to the mobile station via that particular base transceiver station. The SMS center thus can avoid sending SMS messages to all base transceiver stations in a given area, thereby conserving network resources.

9 Claims, 10 Drawing Sheets

FIG. 5

| CELL/SECTOR | NEIGHBORING CELL SECTORS |
| --- | --- |
| 10/1 | 10/2, 10/3, 11/1, 13/2 |
| 10/2 | 10/1, 10/3, 11/3, 12/1 |
| . . . | |
| 15/4 | 15/3, 15/5, 14/2, 17/1, 18/6 |
| . . . | |

FIG. 6

| CELL/SECTOR | NEIGHBORING CELL SECTORS |
| --- | --- |
| 10/1 | 48° 36' TO 48° 38' 50"<br>121° 57' 30" TO 122° 0' 30" |
| 10/2 | 48° 34' TO 48° 36' 15"<br>121° 54' 50" TO 122° 55' 30" |
| . . . | |

LOCALIZED SMS MESSAGING BASED ON
LOCATION OF A MOBILE STATION

CROSS-REFERENCE TO RELATED
APPLICATION

This application claims priority benefits under 35 U.S.C. § 120 as a continuation in part of prior application of Dae-Sik Oh et al., "Localized Paging of a Mobile Station," Ser. No. 10/438,563 filed May 14, 2003, the entire content of which is incorporated by reference herein.

BACKGROUND

1. Field of the Invention

This invention relates generally to wireless communication and more particularly to a method for targeting the delivery of a SMS (Short Message Service) message for a mobile station to a particular base transceiver station serving the current location of the mobile station.

2. Description of Related Art

Cellular wireless is an increasingly popular means of personal communication in the modern world. People are using cellular wireless networks for the exchange of voice and data over cellular telephones, Personal Digital Assistants ("PDAs"), cellular telephone modems, and other devices. In principle, a user can seek information over the Internet or call anyone over a Public Switched Telephone Network ("PSTN") from any place inside the coverage area of the cellular wireless network.

In a typical cellular wireless system, an area served by the wireless provider is divided geographically into a number of cells, each defined by a radio frequency ("RF") radiation pattern from a respective base transceiver station ("BTS") antenna. The BTS antennae in the cells are in turn coupled to a base station controller ("BSC"), which is then coupled to a telecommunications switch or gateway, such as a mobile switching center ("MSC") for instance. The MSC or gateway may then be coupled to a telecommunications network such as the PSTN (public switched telephone network) or the Internet.

When a mobile station (such as a cellular telephone, pager, or appropriately equipped portable computer, for instance) is positioned in a cell, the mobile station communicates via an RF air interface with the BTS antenna of the cell. Consequently, a communication path is established between the mobile station and the telecommunications network, via the air interface, the BTS, the BSC and the MSC.

With the explosive growth in demand for wireless communications, the level of call traffic in most cell sites has increased dramatically over recent years. To help manage the call traffic, each cell in a wireless network may be further divided geographically into a number of sectors (which can be visualized conceptually as pie pieces). Each cell sector is defined respectively by radiation patterns from directional antenna components of the respective BTS, or by respective BTS antennae.

In a Code Division Multiple Access ("CDMA") wireless network, each cell employs one or more carrier frequencies, and each sector is distinguished from adjacent physical sectors by a pseudo-random number offset ("PN offset"). Further, each sector can concurrently communicate on multiple different channels, distinguished by "Walsh codes". When a mobile station operates in a given sector, communications between the mobile station and the BTS of the sector are carried on a given frequency and are encoded by the sector's PN offset and a given Walsh code.

According to industry standard IS-2000 (published in March 2000 as TIA/ELA/IS-2000-A) and IS-95, a mobile station can communicate with a number of "active" sectors at a time. Depending on the system, the number of active sectors can be up to three or six (currently). The mobile station receives largely the same signal from each of the active sectors and, on a frame-by-frame basis, selects the best signal to use.

A mobile station maintains in its memory a list of the sectors in its "active" set. In addition, it maintains in its memory a list of "candidate" sectors (up to six), which are those sectors that are not yet in the active set but that have sufficient signal strength that the mobile station could demodulate signals from those sectors. Further, the mobile maintains a list of "neighbor" sectors, which are those sectors not in the active set or candidate set but are in close vicinity to the mobile station. All other possible sectors are members of a "remaining" set.

In the existing art, when an MSC receives a termination request seeking to connect a call to an idle mobile station that is currently being served by a particular MSC, the MSC responsively directs all of the BSCs within the MSC's serving system to broadcast a general page message to the mobile station. In other words, the general page message is broadcast on the paging channel in every one of the cell sectors within the MSC's serving area. This is an inefficient use of radio resources, since the idle mobile station is at any moment operating in only a single cell sector, not in all of the cell sectors of the MSC's serving area. Similarly, when an SMS message is to be sent to a mobile station, the SMS message is sent to all BTS that are within an MSC's serving area.

It is also known for a MSC to receive a request to connect a call to a mobile station and for the MSC to responsively check with a home location register (HLR) to determine the serving area (cell and sector) in which the mobile device is currently registered to operate, and to then page the mobile station just in the cell/sector. However, the HLR record of where a mobile device is currently registered could become outdated. For example, the HLR might receive a registration record (and therefore update its database) when the mobile station enters a new MSC's serving area, but the HLR might not then receive a registration update as the mobile station moves from cell sector to cell sector within that serving area. Consequently, with the HLR database either inaccurate or not up-to-date, it may not be possible to target a page in a given cell and sector and have the page reach the mobile station.

Blanket paging of the mobile station (and blanket broadcasting of SMS messages) across all of the BSC in the MSC's serving area is largely wasteful of RF resources, since most of the paging or SMS messages would be of no effect because the mobile station is only in one cell and sector (assuming no overlap between cells).

SUMMARY

A method and system is provided of targeting short message service (SMS) messages for delivery to a mobile station. When an SMS center (SMSC) in a cellular network receives an SMS message and is to send it to a mobile station, the SMS center determines the location of the mobile station either directly or indirectly via a location register or other entity. The SMS center determines a particular base transceiver station that serves that location using a BTS database storing cell and sector coverage of a plurality BTSs. The SMSC then causes the SMS message to be delivered to the mobile station via that particular base transceiver station. The SMSC thus can avoid sending SMS messages to all base transceiver stations in a given area or served by a give mobile switching center, thereby conserving network resources.

BRIEF DESCRIPTION OF THE DRAWINGS

An exemplary embodiment of the present invention is described herein with reference to the drawings, in which:

FIG. 5 is an illustration of a table showing the neighboring cells for a given cell and cell sector;

FIG. 6 is an illustration of a table showing the geographic coordinates of a particular cell and cell sector.

DETAILED DESCRIPTION OF AN EXEMPLARY EMBODIMENT

Localized Paging

Figure 1:
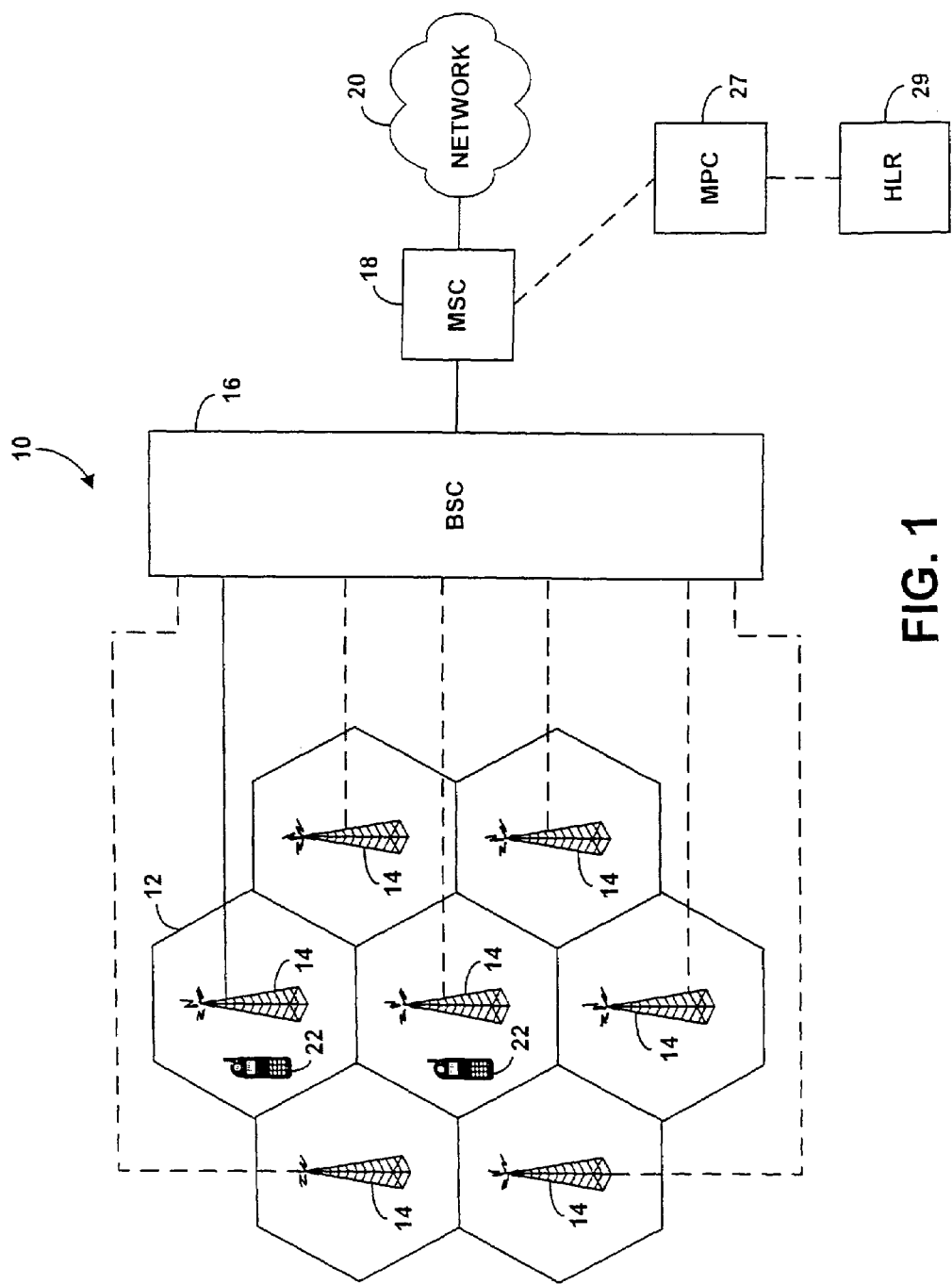
FIG. 1 is a block diagram of a wireless communication network in which the exemplary method can be employed.

Referring to the drawings, FIG. 1 illustrates a simplified block diagram of a wireless communications network 10 in which an exemplary embodiment of the present invention can be employed. It should be understood that this and other arrangements described herein are provided as examples only, and other arrangements and other elements (e.g., machines, interfaces, functions, etc.) can be used instead and some elements may be omitted altogether. Further, as in most telecommunications applications, those skilled in the art will appreciate that many of the elements described herein are functional entities that may be implemented as discrete components or in conjunction with other components, in any suitable combination and location.

As shown in FIG. 1, network 10 includes a number of cells or cell sites 12, the boundaries of which are defined by an RF radiation pattern from a respective BTS antenna 14. FIG. 1 depicts each of the cells in an idealized fashion, as a hexagon that does not overlap other cells. In practice, however, most cells may overlap with neighboring cells and will vary widely in shape and size depending on terrain, type and strength of antenna, etc.

In network 10, the BTS 14 of each cell site communicates with a BSC 16. In turn, the BSC communicates with an MSC 18. The MSC 18 then communicates with a network 20, such as the PSTN or the Internet for instance. (Alternatively, BSC 16 may be coupled with transport network 20 via a packet data serving node ("PDSN") rather than through MSC 18. Still other arrangements are possible as well.) In operation, a mobile station 22 positioned within a cell site of network 10 can then communicate via an air interface with the BTS and, in turn, with an entity on transport network 22 via BSC 14 and MSC 18.

Typically, the MSC 18 may serve as a general control element for network 10, being responsible for setting up and switching calls to and from the cells 12, interfacing with the transport network 20, monitoring traffic to facilitate billing, performing testing and diagnostic services, and performing other network management functions. The BSC 16, in turn, is usually responsible for managing handoff of signaling and call traffic as a mobile station moves from one cell site to another in network 10, and for controlling power levels and frequency allocations.

Figure 2:
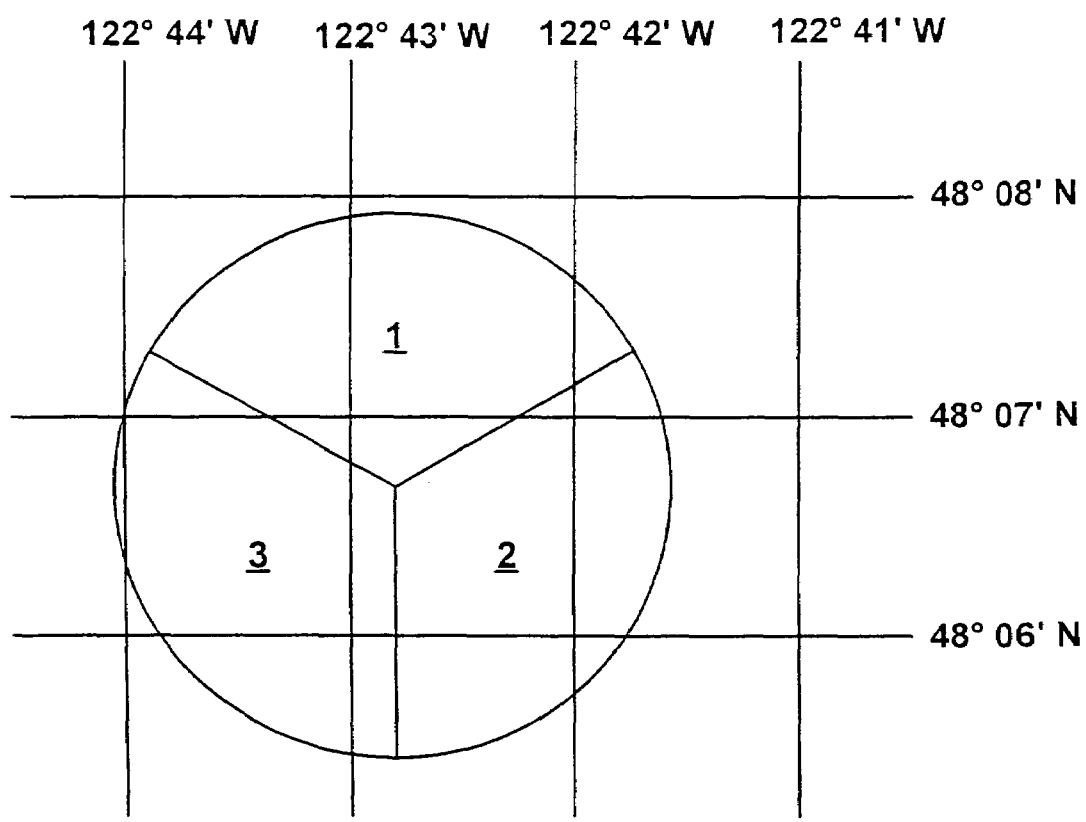
FIG. 2 is an idealized representation of a single cell in a wireless communications network.

As noted above, each cell 12 in a wireless communications network may be subdivided into a number of sectors, typically defined by directional radiation patterns from antenna elements on the BTS. FIG. 2 illustrates one such cell 24, idealized as a circle. Cell 24 is shown subdivided into three sectors 1, 2 and 3, although a cell could have more or fewer sectors. As is typical, the sectors are shown as physically discrete areas. In reality, however, there will likely be some overlap between the sectors even within a given cell.

To carry out the targeted paging of a mobile station to a particular cell and sector, the network includes a provision by which the current geographic location of the mobile station is determined (described below). Additionally, there is a mapping of cells and cell sectors to particular geographical coordinates that cover such cells and sectors. This is so that for a given geographic coordinate for the mobile station, it is possible to determine which cell and sector encompasses that location. In one possible embodiment, this mapping of cell sectors to geographical coordinates is carried out in a table or other suitable method in a mobile positioning center (MPC) 27, shown in FIG. 1.

As shown in FIG. 2, the geographic coverage of the cell 24 can be measured or defined by the Earth's geographical coordinates such as latitude and longitude coordinates. For example, in FIG. 2 the cell 22 extends roughly between 48° 05' North and 48° 08' North latitude, and between 122° 41' West and 122 ° 44' West longitude.

In the example of FIG. 2, the cell 24 could be represented as a circle of radius R centered at 48° 06'38" North and 122° 42'51" West. The geographical coordinates of the edges or boundaries of the individual sectors 1, 2 and 3 could be similarly identified, perhaps as bearings from the center of the cell, the coordinates of the center and the edge of the cell, and the portion of the arc forming the perimeter of the cell. The manner in which the geographic locations for the sectors of the cell are characterized or determined is not important. It may simplify the representation of the cells and sectors by approximating the cell and sector to a boundary whose perimeter only extends in North/South and East/West directions. Thus, the geographic coverage area of a given sector can be defined in any desired manner, the details of which are not necessarily critical to this invention.

For purposes of example, the geographic coverage area of a given sector can be considered the area that encompasses all points where a mobile station can usefully communicate with the base station serving the sector. In this regard, a judgment may be made that at least a certain minimum signal strength is required in order to support communication between a mobile station and the base station (to avoid excessive frame error rate, for instance). Therefore, a sector may be said to cover those geographic positions where a mobile station is likely to be able to receive BTS signals of at least the minimum signal strength and/or where the BTS is likely to be able to receive MS signals of at least the minimum signal strength.

Note that the radiation pattern defined by a BTS may in fact extend well beyond what may be considered to be the coverage area of a given sector, since the radiation pattern may extend to areas where the signal strength for communication between a mobile station and the BTS is insufficient. This may occur with distance from the BTS, and as a result of obstructions such as buildings, foliage and land elevation.

In accordance with the exemplary embodiment, a BSC, MSC or MPC (or another entity) will maintain or have access to a database that indicates the geographic coverage of each sector in a given area. For instance, a BSC can maintain in memory (or in another storage medium) a database that indicates the geographic coverage of each sector in the BSC's coverage area (i.e., each sector defined by the BTS's that the BSC controls).

The exemplary database, which may be referred to as a "sector coverage database," can take any of a variety of forms, the details of which are not critical. As an example, the database can include a table in which each record has a "Location" field and a "Sector" field. The Location field can indicate a geographic position (such as latitude/longitude coordinates) or a range of geographic positions (such as a range of latitude/longitude coordinates). The Sector field can then indicate one or more sectors that encompass the location indicated in the Location Field. Each sector can be identified by a BTS identification (BTSID) code and a sector phase (e.g., 1, 2 or 3), or in any other manner desired.

As another example, the database can be arranged relationally, with a "Location" table and a "Sector" table. The Location table can list each geographic position or range of positions in a given area. The Sector table can then list each sector in the area and can include a reference to a geographic position or range in the Location Table. For a position that is encompassed by multiple sectors, multiple records in the Sector table can reference the same position in the Location table. Many other examples are possible as well.

Preferably, the sector coverage database also includes an indication, per sector, of the geographic position where the BTS of the sector resides, i.e., the point of origin (or the approximate point of origin) of the sector. This point of origin can be used to identify which of multiple sectors is closest to a mobile station. In the exemplary embodiment, the sector coverage database can be populated with values through any of a variety of procedures, the details of which are not critical. Further, the contents of the database can be updated as desired, such as when a substantial change occurs in topography or base station architecture.

By way of example, signal strength measurements can be made at various positions throughout an area. In particular, at a given position, measurements of pilot signal strength (e.g., $E_c/I_o$) may be made periodically for all pilots, such as through use of fixed position or mobile test sets (such as the Remote Mobile Diagnostic System available from Willtech International, Inc. of Santa Ana, Calif., for instance). An average signal strength over time may then be computed for each pilot at that position. If the average signal strength of a given pilot exceeds a particular threshold (such as −13 dB, for instance), that pilot's sector can be said to exist at the given position. And an entry may be made in the sector coverage database, correlating the given position with that sector (i.e., indicating that the sector covers that given position).

In this way, a determination can be made that a given position falls within only one sector, if, at that position, the average signal strength of that sector's pilot over time exceeds the particular threshold, while the average signal strength of each other sector's pilot does not exceed the threshold. Alternatively, a determination may be made that a given position falls within two sectors if the average signal strength of each (of the two) sector's pilot exceeds the threshold, while the average signal strength of each other pilot does not. Further, a determination may be made that a given position falls within three or more sectors in the same way.

As another example, a cellular wireless carrier or other entity can conduct a more automated analysis to produce the sector coverage database (or the data to be held in the database). For instance, the carrier can apply a software package such as Planet DMS2.2 (available from Metapath Software International, London, England, www.msi-world-.com). The Planet system functions to plot the boundaries of sectors, based on signal strength measurements and other factors, and to establish a database that indicates which geographic positions are encompassed by which sectors.

A cellular carrier can input into the Planet system indications of parameters for each sector such as the BTS model, the antenna model, height and azimuth, the BTS power output, the threshold signal levels (e.g., T_ADD and T_DROP) and geographical information such as the latitude and longitude coordinates of buildings and other obstructions in the air interface. And the Planet system can output the BTS signal strength level (e.g., $E_c/I_o$) and handoff boundaries over the geographical plot. Other methods of establishing geographic coverage database may exist as well.

Figure 3:
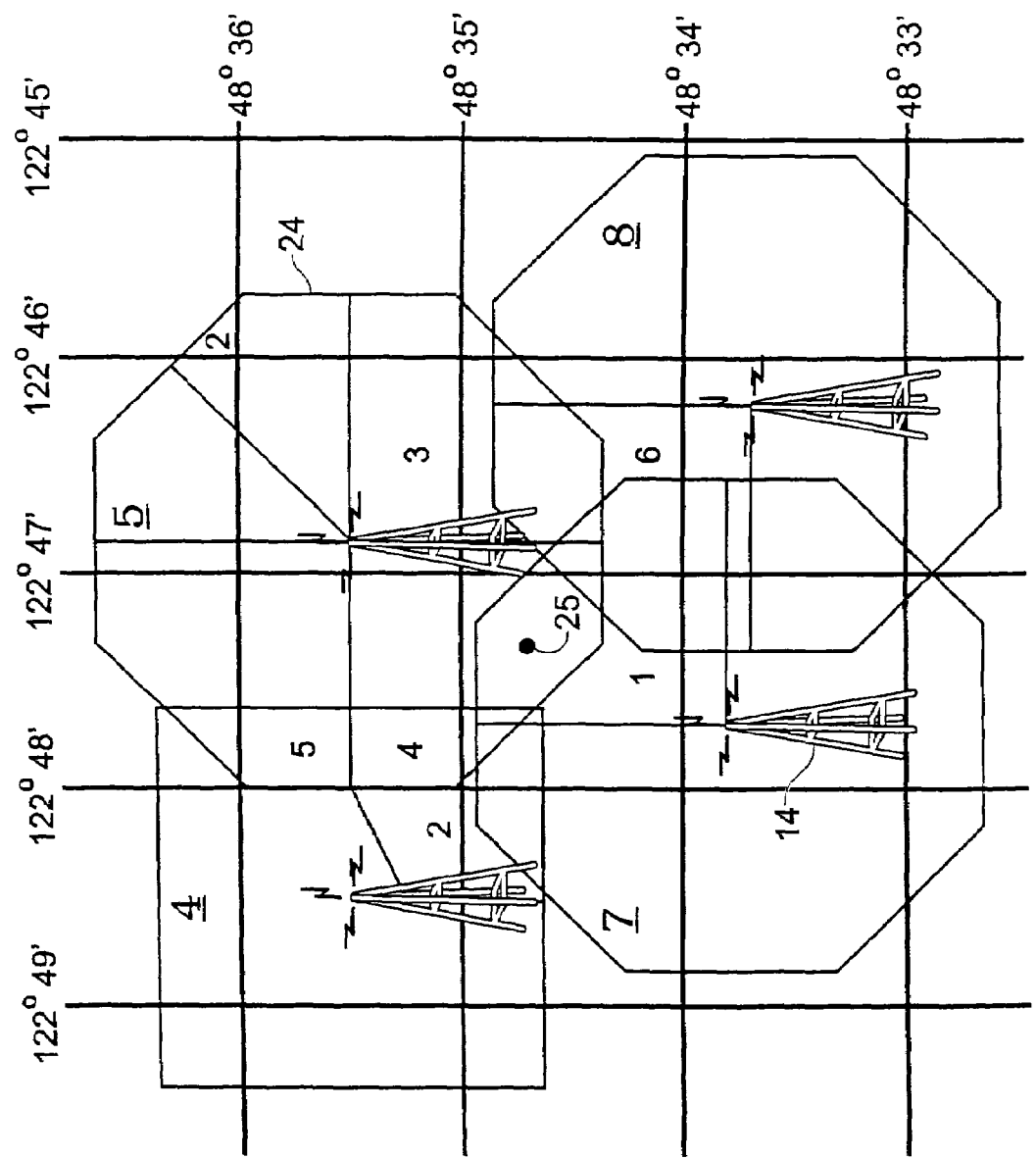
FIG. 3 is a representation of multiple cells in a wireless communications network in which there is a partially spatial overlap in coverage between the various sectors in the cells.

While the example of FIG. 2 is somewhat simplified, in practice the cells may have an irregular boundary and the coverage of multiple cells may at least partially overlap, as shown in FIG. 3. FIG. 3 shows four cells 24, identified as cells 4, 5, 7 and 8. There is some overlap at the edges. If the mobile station is located at position 25 in the figure, this position is covered by sector 4 of cell 5, as well as sector 1 of cell 7. Again, the geographical coordinates of the boundaries of each of the cells and sectors are stored in the table or database as indicated above.

Figure 4:
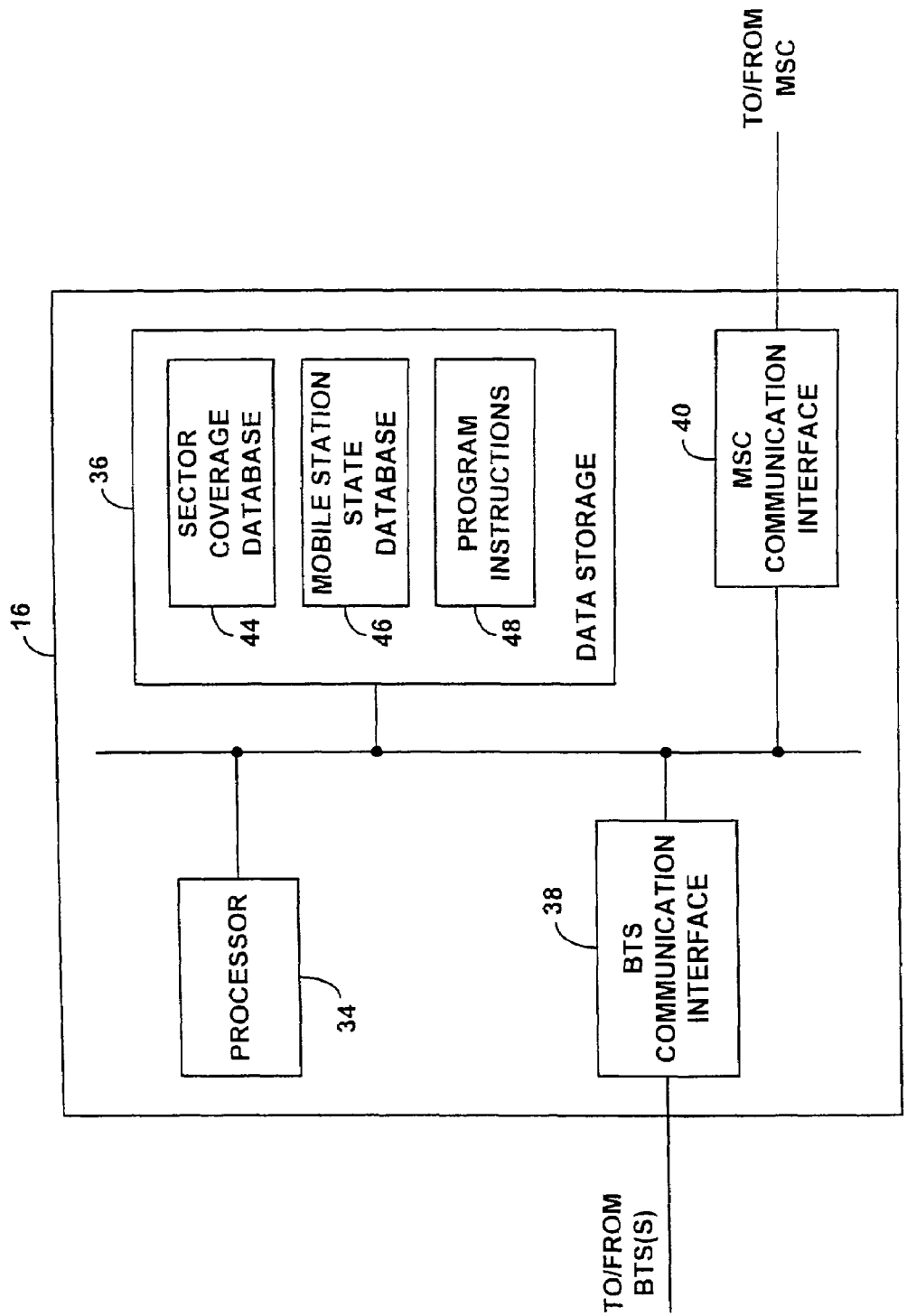
FIG. 4 is a block diagram of an exemplary base station controller.

FIG. 4 is a simplified block diagram of an exemplary BSC 16 arranged to carry out the functions described herein in one possible embodiment. As shown in FIG. 4, exemplary BSC 16 includes a processor 34, data storage 36, a BTS communication interface 38 and an MSC communication interface 40, all of which may be coupled together by a system bus 42.

In one possible embodiment, data storage 36 holds (i) the sector coverage database 44, (ii) a mobile station state table 46, and (iii) program instructions 48. The sector coverage database 44 has been described by way of example above. The mobile station state table 46 preferably functions to maintain a record of the current (latest) location of each mobile station in the BSC's service area, as well as a record of the current active set assigned to the mobile station.

The program instructions 48 are then preferably a set of machine language instructions executable by processor 34 to carry out functions described herein, such as monitoring mobile station location, consulting the sector coverage database 44 to determine which sector or sectors encompass the mobile station's location, establishing an active set, and sending a paging, SMS message or other such message to the mobile station (i.e., providing such a message for transmission via the BTS communication interface 38 to the mobile station). Alternatively, BSC 16 can include hardware and/or firmware to carry out some or all of these functions.

The sector coverage database 44 may also include a table of neighboring cell sectors, based on the geographical coverage of the various cells and cell sectors. For example in FIG. 5, one possible construction of such a table is shown. In the left hand column, the cells and sectors are listed. In the right hand column, there is a list of the neighboring cells/sectors.

FIG. 6 shows one possible format for storing geographical coordinates for a given cell and sector. For example, cell 10 sector 1 has coordinates extending from 48° 36' North to 48° 38'50''' North latitude, and between 121° 57'30" West and 122° 0'30" West longitude. While FIG. 6 is perhaps an oversimplification for a given sector coverage since it defines a rectangular area, it illustrates the point that the database includes information whereby for each sector there is geographical data that defines its perimeter in a manner such that, given a geographical coordinate of the location of a given mobile station, it is possible to consult the table or database and extract a given cell and sector that covers that location.

In alternative embodiments, the sector coverage database and mobile station state database could be provided at other entities in the wireless network, including the mobile switching center (MSC) or in the mobile positioning center (MPC) of FIG. 1.

As noted above, the BSC, MSC, MPC or other suitable entity is charged with the task of obtaining the current geographical location of the mobile station, and will include appropriate computing resources and software for obtaining this information. The process of determining the location can involve simply receiving an indication of the location directly from the mobile station or a more active means may be required for performing the process to establish the location. In the exemplary embodiment, the BSC may determine mobile station location in any of a variety of ways, preferably employing the latest available location-determining technologies.

For example, if the mobile station is equipped with GPS location-determining technology, the mobile station can determine and report its current location to the BSC, using industry standard messaging (such as that defined by industry standard IS-801 (published in October 1999 as TIA/EIA/IS-801), for instance). The mobile station may be programmed to regularly (e.g., every 30 ms) report its location and/or the BSC may be programmed to regularly request the mobile station's location and the mobile station may respond accordingly.

As another example, a cellular carrier can employ any of a variety of network-based positioning determining equipment ("PDE") and techniques, such as triangularization for instance, to establish measurements of mobile station location. This positioning determining equipment could be provided at the mobile positioning center (MPC) shown in FIG. 1. The carrier may also maintain a record or register of MS location in the MPC, and the BSC may query the MPC to identify the location of a given MS. Other examples are possible as well.

In one possible embodiment, the BSC preferably carries out the location determining process periodically or continuously. The BSC preferably consults the mobile station state table 46 to determine if the mobile station's position has changed from the last position that the BSC had recorded for the mobile station. If the BSC determines that the mobile station's position has changed (or has changed sufficiently), then the BSC records the mobile station's current position in the state table 46.

Figure 7:
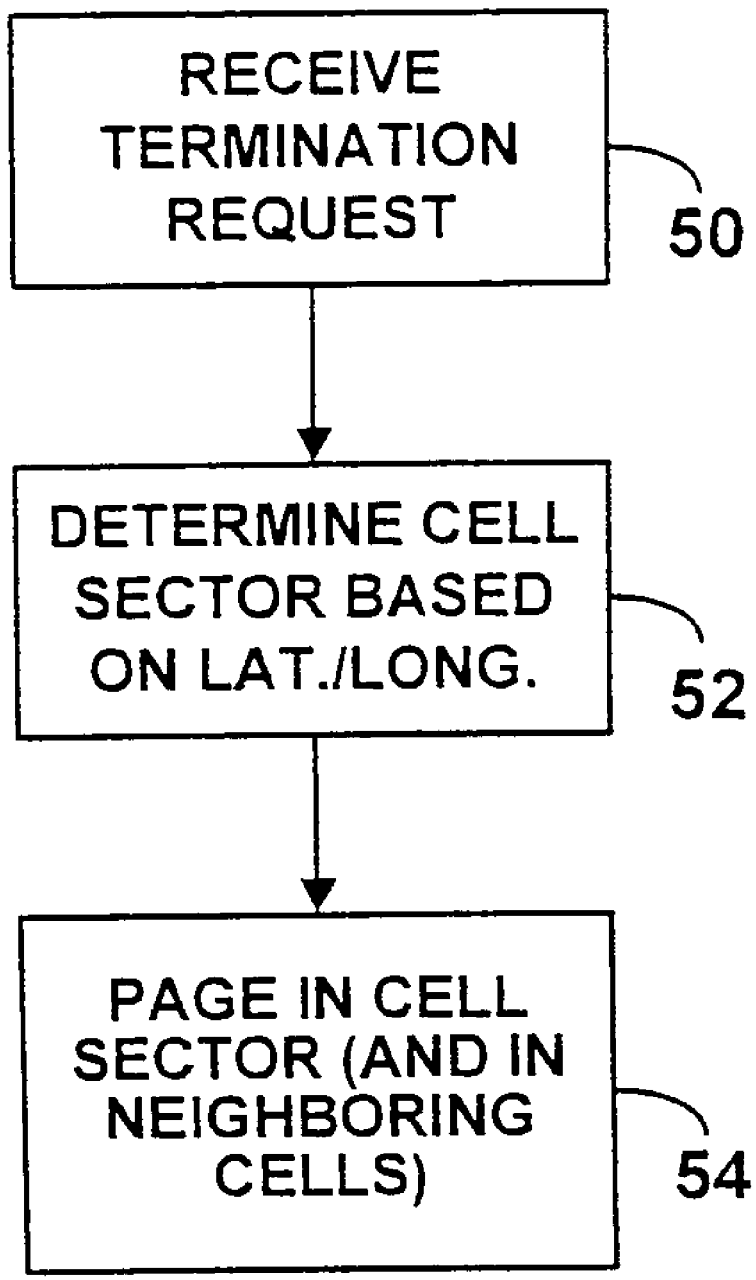
FIG. 7 is a flow chart showing the overall steps in location based paging.

An exemplary embodiment of targeted paging is shown in flow chart form in FIG. 7. At step 50, an MSC receives a termination request seeking to connect a call to an idle mobile station. At step 52, the MSC will determine the cell sector in which the mobile station is currently operating based on the geographical coordinates (latitude and longitude) of the location of the mobile station. At step 54, the MSC will then cause the mobile station to be paged in just that cell sector and perhaps in neighboring cell sectors, rather than causing the mobile station to be paged in all of the cell sectors served by the MSC or by a given BSC.

Figure 8:
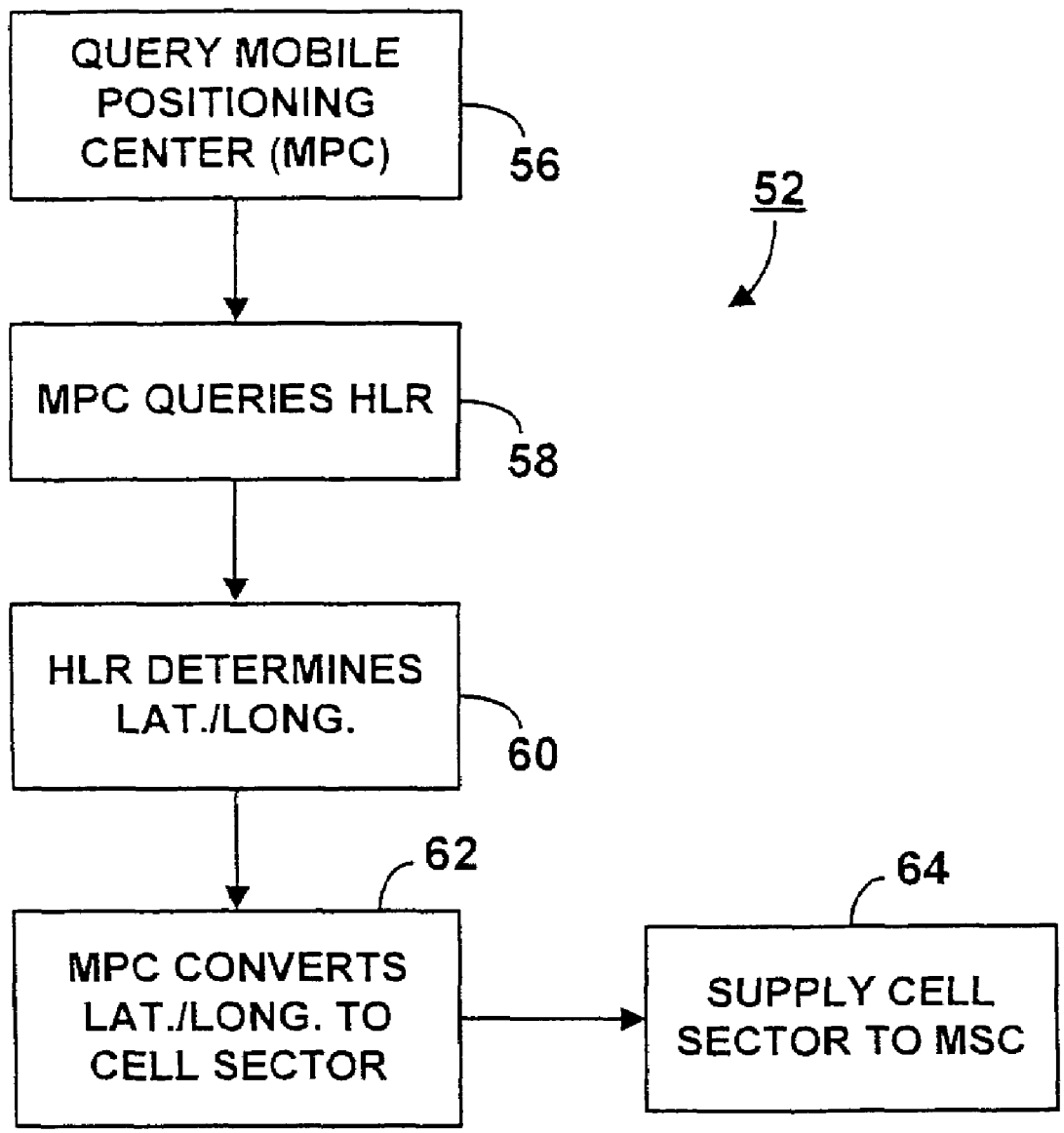
FIG. 8 is a flow chart of the method step of FIG. 7 of determining the cell and sector based on the latitude and longitude coordinates of the mobile station.

Step 52 can be performed in a variety of methods, one of which in shown in flow chart form in FIG. 8. In this embodiment, when the MSC receives the termination request, the MSC queries a location determining system (such as a mobile positioning center (MPC) as defined by J-STD-036) to determine the cell sector in which the mobile station is currently operating. This is indicated at step 56. To be able to provide this information, the system might periodically determine the geographic location of all mobile stations registered in the MSC's serving area and store this information in a location register (such as a home location register (HLR) 29 in FIG. 1) in the form of a table or database and periodically or continually update the table. The MPC accesses this information by sending a query to the home location register, as shown in step 58. The HLR then determines the latitude and longitude of the mobile station by reference to a database or table containing this information, as indicated at step 60. The HLR provides this information to MPC, which then determines the cell and sector that covers this location, such as by reference to another table or database that stored the cell and sector geographical coordinates, such as shown in FIG. 6. This is shown in FIG. 8 at step 62. Finally, the MPC supplies the cell sector to the MSC, as shown in step 64.

Figure 9:
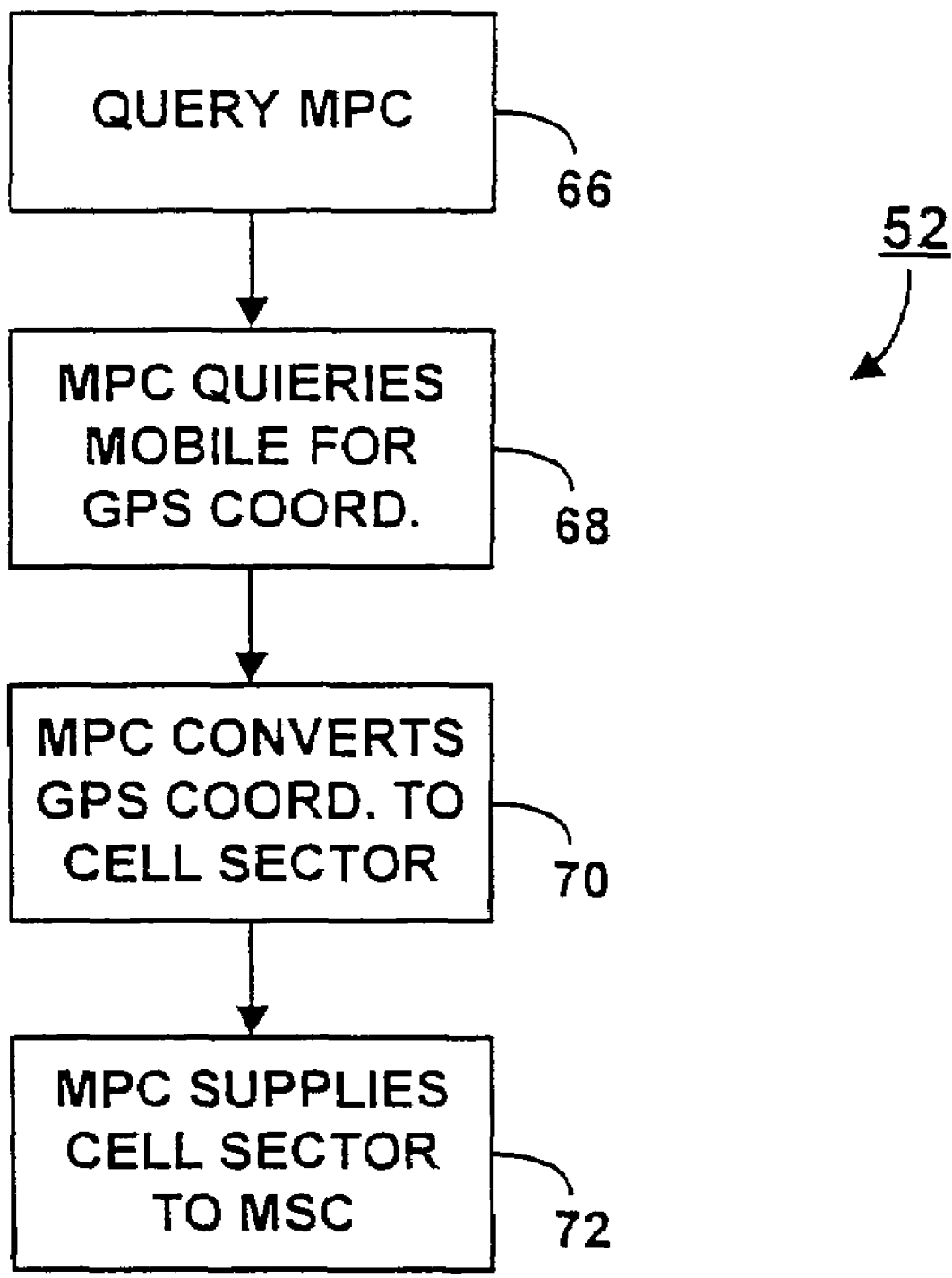
FIG. 9 is a flow chart showing an alternative method for the step of FIG. 7 of determining the cell and sector based on the latitude and longitude coordinates of the mobile station.

FIG. 9 is a flow chart of an alternative embodiment for determining the cell sector based on the geographic position of the mobile station. In the method of FIG. 9, the MSC sends a query to the MPC to acquire the cell and sector at step 66. At step 68, the MPC sends a query the mobile station itself to acquire a Global Positioning System (GPS) reading, thereby obtaining a dynamic, real time indication of the position of the mobile station. Step 68 could also simply comprise the step of receiving the GPS reading in the situation where the mobile station continuously sends GPS data. At step 70, the MPC converts or translates that geographic location to a cell sector by reference to translation data, a database or formulae that correlate latitude and longitude of a mobile station to a given cell and sector. At step 72, the MPC provides the cell sector to the MSC.

Figure 10:
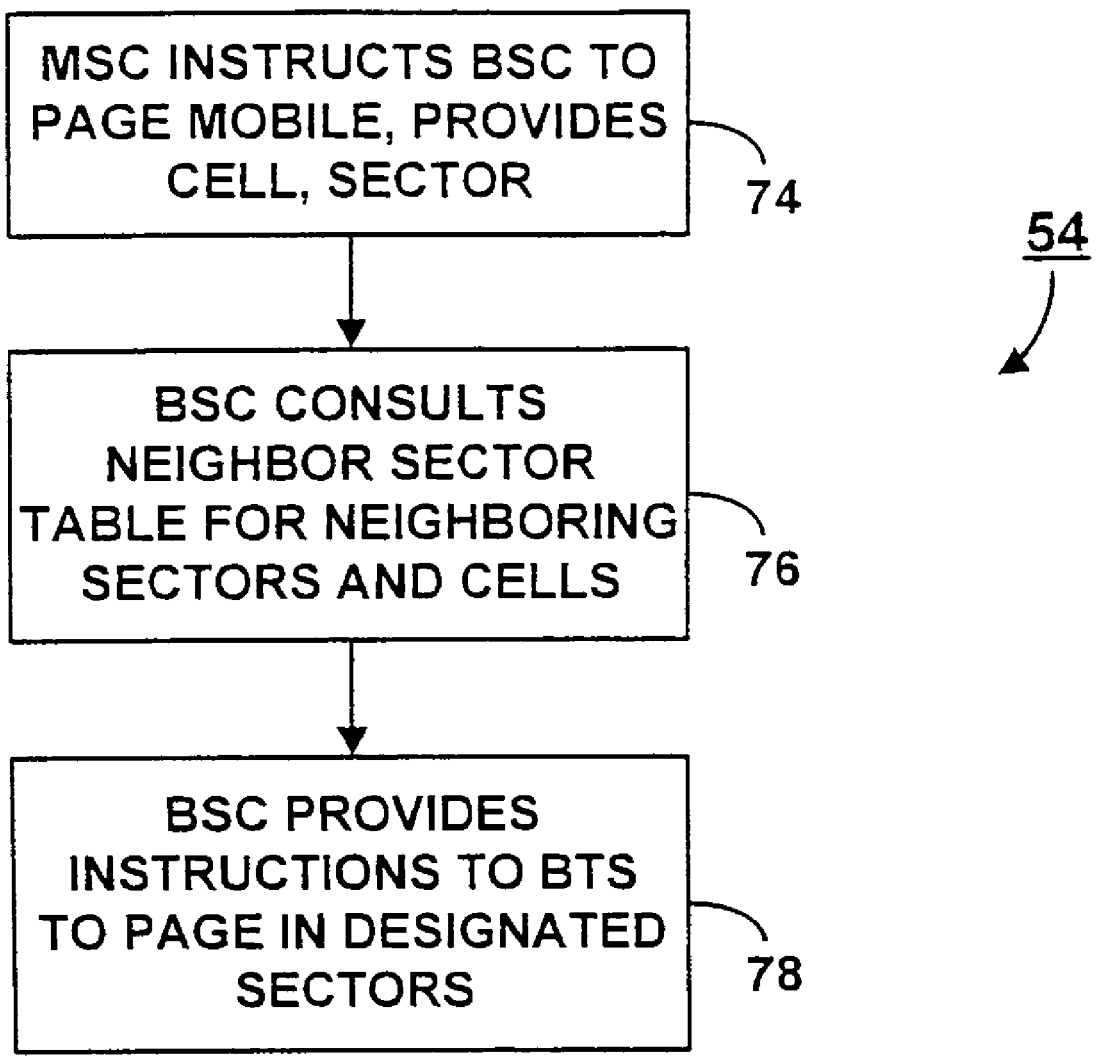
FIG. 10 is a flow chart showing a preferred embodiment of the method step of FIG. 7 of initiating a page of the mobile station based on the current location of the mobile station.

Referring back to step 54 in FIG. 7, given knowledge of the cell sector in which the mobile station is currently operating, the MSC may then signal to the BSC serving that cell sector, directing the BSC to page the mobile station in that cell sector and, perhaps, in neighboring cell sectors. This is shown as step 74 in FIG. 10. In the situation where pages are sent to neighboring cell sectors, the BSC consults a neighbor sector table (see FIG. 5) to determine the cell and sectors that neighbor the cell sector that the mobile is currently operating in. This is shown in FIG. 10 as step 76.

Finally, at step 78, the BSC provides instructions in the form of the message to a particular BTS antenna or antennae to page the mobile station in designated sector or sectors. Thus, the BSC may then responsively page the mobile station only in a given cell sector. Alternatively, the BSC may look to its neighbor-sector table to determine cell sectors that neighbor the cell sector in which the mobile is currently located, and the BSC may cause a page the mobile in those neighboring cell sectors as well.

Localized Delivery of SMS Messages

The concept of localized paging of a roaming mobile station as described above can be extended to localized, targeted delivery of Short Message Service (SMS) messages to mobile stations. This section will describe this embodiment of the invention.

SMS is a text-based messaging service wherein a network entity (such as a computer on the Internet) or another wireless mobile station, can sent a relatively brief alphanumeric message to a mobile station. The mechanics of SMS messaging is defined in the IS-41 standards document and in textbooks describing that standard. The SMS standard is described in the IS-637-A standards document, the content of which is incorporated by reference herein. SMS messaging is also described in the patent literature, including U.S. Pat. No. 6,718,178, the contents of which are incorporated by reference herein.

SMS provides for the communication of short text messages to or from a mobile station or other entity without establishing a call connection. In general, the system may allow a person to simply type in a desired text message, indicate the directory number associated with a destination mobile station, and then transmit an SMS message encapsulating the desired text message. The telecommunications network then conveys the text message to the destination mobile station, where the message is typically displayed for receipt by an end-user.

A wireless network may provide a short message service center ("SMSC") (sometimes also referred to simply as a message center ("MC")), which is a functional entity that stores and forwards SMS messages. The store and forward function provides a method of sending short messages to their destination recipient or storing those messages if the recipient is unavailable to receive them. This store and forward function can generally be distinguished from the real-time delivery requirements of voice calls, although SMS messages may be delivered in real time.

According to industry standards, the message center can send messages to or from a functional entity known as a short message entity ("SME"). The SME is often an application entity that resides on a MS, and may sometimes be referred to as an MS-based SME. Alternatively, the SME can comprise, or reside on, another entity in a wireless or fixed network, i.e., in whether or not part of the wireless communications network. Typically, the SME can be arranged to compose, store, dispose of, act upon, display and/or otherwise manage short messages. It can also perform signaling functions to support other delivery features such as MS location and status queries, and mapping of destination addresses. In general, a typical SMSC can forward messages to an SME, store short messages for later delivery to an unavailable SMEs, apply originating and terminating SMS supplementary services (e.g., intelligent network services) to short messages, and serve other functions.

Each MS-based SME is usually associated with an SMSC known as the "home SMSC" in the MS's home system. The MS-based SME is qualified like an MS is qualified, with a home location register sending SME service profile information (origination and termination restrictions) to an SMS-capable serving system along with MS related profile parameters, so that the serving system can know that the MS is qualified to receive and/or send short messages. Typically, a given SMSC then maintains the mobile identification number (MIN) address information of the MSs that it serves, and the SMSC is addressable by the directory numbers (e.g., telephone numbers, IP addresses, e-mail addresses, etc.) of those MSs for mobile terminated messages. Further details of the signaling involved in traditional SMS processing can be found in the Michael D. Gallagher and Randall A. Snyder, "Mobile Telecommunications Networking With IS-41" (McGraw-Hill 1997).

In accordance with preferred aspects of this invention, when the SMSC receives a message for one of its MSs, it determines the current geographical location of the MS. This can be done by the SMSC directly, or more preferably by querying a separate entity such as a location register, mobile positioning center (MPC) or other position determining entity. The SMSC then correlates that location with a particular BTS serving the current location of the mobile station. The SMSC then causes the SMS message to be delivered to the MS via just that BTS, rather than generally all BTSs in a given area.

In the prior art, when a mobile station is currently active a signal from the MS is received constantly via a particular BTS, so the system knows that when it sends a message to the MS it should send it via just that BTS communicating with the mobile station. In other words, the prior art involves sending the message via the BTS through which the mobile station constantly transmits to the system. Note that such constant transmission from the mobile station can be a capacity drain. The prior art does not apparently engage in an active location determination process, at least insofar as SMS messaging forwarding is concerned.

As noted above, the location of the mobile station could be determined through the use of a separate location determination entity such as a mobile positioning center. Alternatively, the geographical location of the mobile station could be determined by obtaining a Global Positioning System (GPS) location signal that is transmitted from the mobile station to the wireless network and sent to the SMSC. Alternatively, known triangulation techniques for location of a mobile station using round trip delay measurements could be used to determine the mobile station location. In any event, the SMSC will determine the location of the mobile station to receive the SMS message using one of these methods.

The method further includes a step of identifying a base transceiver station that covers the current geographic location of the mobile station. This step can be performed for example by consulting a table or database that contains geographical coordinates of all the cell sectors served by base transceiver stations and identifying the base transceiver station that has cells or sectors that encompasses the current geographical location of the mobile station. This is similar to the process described above in the localized paging of a mobile station. This process could be performed by the SMSC directly or by querying a separate entity that translates mobile station location data to particular BTS that serves a given location.

The method further includes the step of sending the SMS message to the identified base transceiver station for delivery over an air interface to the mobile station. Thus, once the SMSC has identified the particular BTS currently serving the mobile station, it sends the SMS message over the wireless network infrastructure to the BTS and the BTS sends the SMS message to the mobile station over the air interface.

The advantage of this method is that it conserves network resources. In particular, in preferred embodiments the only BTS that receives the SMS message is the one currently serving the mobile station. The BTS that are not currently serving the mobile station do not receive the SMS message (which would be pointless anyway since if they broadcast it within their respective sectors it would not be received). This technique avoids any waste of BTS air resources.

As noted, the current geographic location could be determined by a position determining entity dedicated to determination of current geographic location of a plurality of roaming mobile stations, and wherein the SMS center queries the position determining entity to arrive at the location of the mobile station. The position determining entity could be embodied as software or hardware and be co-located or embodied in any suitable general purpose computing device, or incorporated a machine that performs other functions such as a home location register (HLR) in IS-41. In preferred embodiments, the geographic location of the mobile station is determined dynamically at the time the SMS message is received as the SMSC. The position determining entity preferably includes a location register and periodically updates the geographic coordinates of the mobile station as it moves.

The step of translating the location of the mobile station to a particular base transceiver station includes a step of comparing the geographic location of the mobile station with a database containing geographical coordinates of a plurality of cell sectors served by a plurality of base transceiver stations, and responsively determining the base transceiver station that encompasses the current geographical location of the mobile station. This is similar to the techniques described above for localized paging of a mobile station. The mobile station location features described above for the paging embodiment include a level of granularity to individual cell sectors. This level of granularity may be used in one possible embodiment for the SMS message delivery. Alternatively, the level of granularity could be one level higher; i.e., a particular BTS serving the location of the mobile station is identified, but not the particular cell sector.

Figure 11:
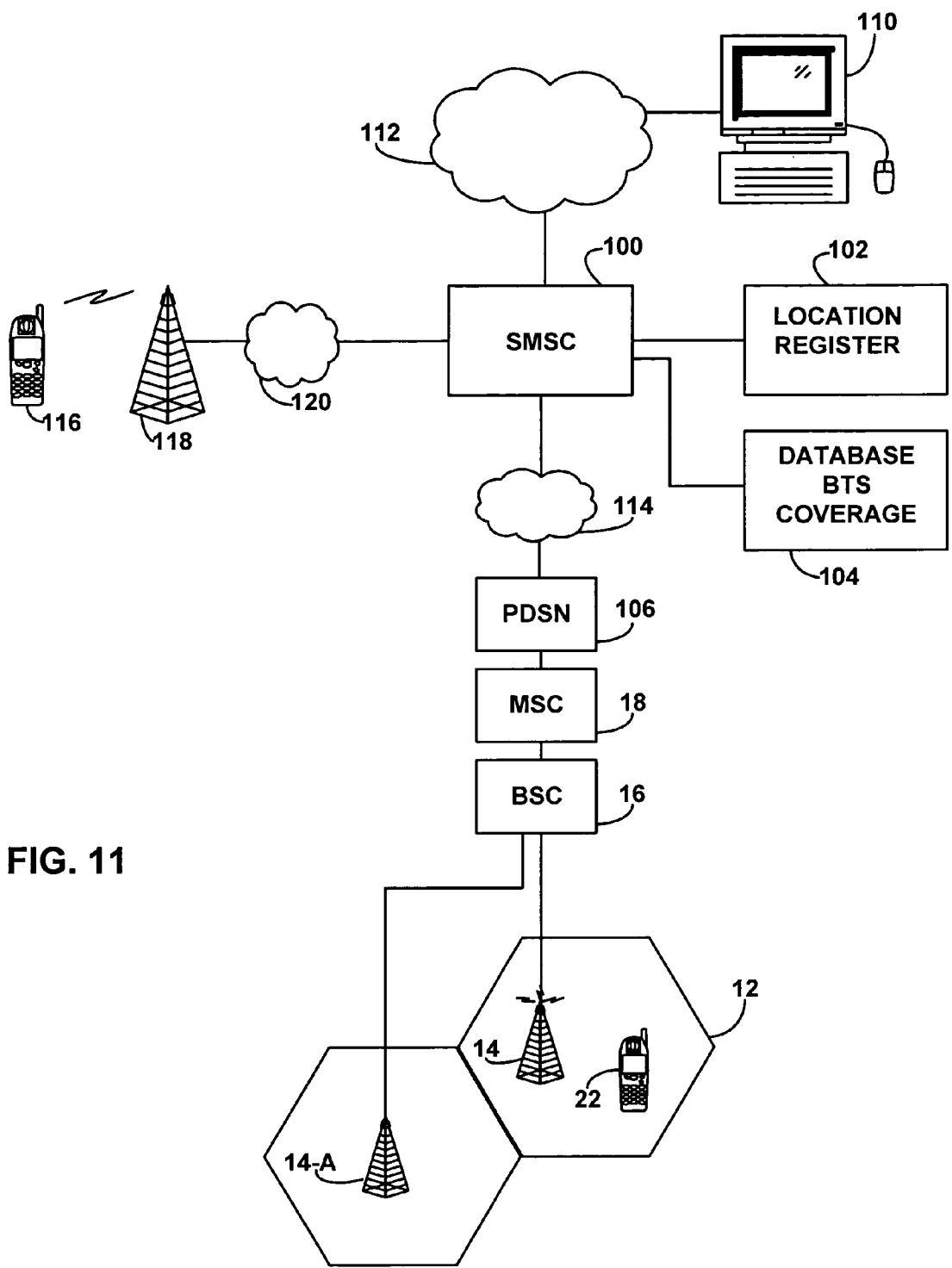
FIG. 11 is an illustration of a system for localized, targeted distribution of SMS messages.

Referring now to FIG. 11, an exemplary embodiment of a wireless network system is shown with targeted delivery of SMS messages intended for delivery to a mobile station 14. The messages could original as SMS message from a computer 110 or other computer connected to a network 112, or from a wireless device such as a cellular phone 116. The system includes an SMS center 100 that receives an SMS message for the mobile station 14 and stores the SMS message locally. The system further includes the wireless infrastructure for delivering the message to the mobile station, including a wireless service provider backbone network 114, a packet data serving node 106, mobile switching center 18 and base station controller 16. The base station controller 16 is coupled to a base transceiver station 14 transmitting SMS messages to mobile stations in cells and sectors served by the base transceiver station 14.

The SMSC 100 is coupled to a database 104 containing information as to the geographical coverage of the cells and sectors served by a plurality of base transceiver stations (such as all the base transceiver stations in the wireless service provider network). The database could also contain information as to the cells and sectors of adjacent base transceiver stations.

The SMSC is also coupled to a location register 102 containing the geographical coordinates of the current location of a plurality of mobile stations. The information in the location register 102 could be populated from GPS data from the mobile stations, from queries sent to position determining entities, or otherwise as noted earlier. Preferably, the current location is periodically updated. The geographic location of the mobile station could also be dynamically determined at the time the SMS message is received e.g., via a query to a position determining entity (not shown).

The SMSC retrieves the current geographical location of the mobile stations, and then queries the BTS location database 104 to thereby identifying a base transceiver station 14 that covers the current geographic location of the mobile station 22.

When the SMSC determines the BTS servicing the current location of the mobile station, the SMS center responsively sends the SMS message for the mobile station 22 to the particular BTS 14 currently serving the mobile station. This targets the SMS message to just the BTS 14 that can use it. To save network resources, it does not send SMS messages to base transceiver stations that are not currently serving the mobile station, such as for example the BTS 14A.

As used herein, the term "mobile station" is to be interpreted broadly as encompassing pagers, cellular telephones, wireless personal digital assistants, portable computers, and other devices now known or later devised that are mobile. The term SMS center is to be interpreted broadly to cover any device or system that is responsible for delivering SMS messages to mobile devices.

Changes and modifications from the illustrated embodiments may be made without departure from the scope of the invention. For example, while the foregoing description has indicated that various functions could be carried out in a mobile positioning center, home location register, base station controller and/or a mobile switching center, these functions could be carried out in other devices or interchanged between the identified elements. For instance, the MSC could be the entity that determines geographic location of mobile devices and converts that information to cell and sector information, without requiring the services of a home location register. Similarly, these functions could be performed entirely by the base station controller.

We claim:

1. A method of targeting a short message service (SMS) message for delivery to a particular mobile station, comprising the steps of:
   a) receiving an SMS message at an SMS center intended for delivery to a particular mobile station without taking into account where said mobile station may be registered;
   b) determining the current geographic location of said mobile station without taking into account where said mobile station may be registered;
   c) using the current geographic location determined without taking into account where said mobile station is registered, the SMS center identifying a particular base transceiver station that covers the current geographic location of said mobile station; and
   d) sending the SMS message to the identified particular base transceiver station that covers the current geographic location of said mobile station for delivery over an air interface to said mobile station.

2. The method of claim 1, wherein the current geographic location is determined by a location register dedicated to determination of current geographic location of a plurality of roaming mobile stations, and wherein the SMS center queries the location register step in step b).

3. The method of claim 1, wherein the geographic location of said mobile station is determined dynamically at the time the SMS message is received.

4. The method of claim 1, wherein the geographic location of said mobile station is determined by reference to a location register, said location register comprising a list of mobile stations and their current geographical location, said location register periodically updated with the geographic coordinates of said mobile station.

5. The method of claim 1, wherein the step of translating comprises the step of comparing the geographic location of said mobile station with a database containing geographical coordinates of a plurality of cell sectors served by a plurality of base transceiver stations and responsively determining the base transceiver station that encompasses the geographical location.

6. A wireless network system with targeted delivery of a short message service (SMS) message intended for delivery to a particular mobile station regardless of where the mobile station may be registered, comprising:

an SMS center receiving an SMS message for a particular mobile station;

a base transceiver station transmitting SMS messages to mobile stations in cells and sectors served by the base transceiver station; a database containing geographical coverage of the cells and sectors served by a plurality of base transceiver stations;

a location register containing geographical coordinates of the current location of said mobile station; software identifying a particular base transceiver station that covers the current geographic location of said mobile station without taking into account where said mobile station is registered; wherein the SMS center responsively sends the SMS message to the identified particular base transceiver station that covers the current geographic location of said mobile station and does not send SMS messages to base transceiver stations that are not currently serving the mobile stations.

7. The system of claim 6, wherein the geographic location of said mobile station is determined dynamically at the time the SMS message is received.

8. The system of claim 6, wherein the location register comprises a list of a plurality of mobile stations and their current geographical location, said location register periodically updated with the geographic coordinates of said plurality of mobile stations.

9. The system of claim 6, wherein the software comprises a set of instructions comparing the geographic location of said mobile station with a database containing geographical coordinates of a plurality of base transceiver stations and responsively determining the base transceiver station that encompasses the geographical location.

* * * * *